(12) United States Patent
Mima et al.

(10) Patent No.: US 10,014,793 B2
(45) Date of Patent: Jul. 3, 2018

(54) POWER CONVERSION UNIT, POWER CONVERTER, AND POWER CONVERSION METHOD

(71) Applicant: Hitachi, Ltd., Chiyoda-ku, Tokyo (JP)

(72) Inventors: Akira Mima, Tokyo (JP); Yukio Hattori, Tokyo (JP); Tetsuya Kawashima, Tokyo (JP); Yuichi Mabuchi, Tokyo (JP); Daisuke Matsumoto, Tokyo (JP); Hiroshi Kamiduma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 164 days.

(21) Appl. No.: 15/025,370

(22) PCT Filed: Mar. 10, 2014

(86) PCT No.: PCT/JP2014/056122
§ 371 (c)(1),
(2) Date: Mar. 28, 2016

(87) PCT Pub. No.: WO2015/136593
PCT Pub. Date: Sep. 17, 2015

(65) Prior Publication Data
US 2016/0373017 A1    Dec. 22, 2016

(51) Int. Cl.
*H02M 7/00* (2006.01)
*H02M 5/458* (2006.01)
(Continued)

(52) U.S. Cl.
CPC ............. *H02M 5/4585* (2013.01); *H02J 9/06* (2013.01); *H02M 7/003* (2013.01);
(Continued)

(58) Field of Classification Search
CPC .. H02M 5/4585; H02M 7/537; H02M 7/2173; H02M 7/003; H02M 7/5387; H02J 9/06
See application file for complete search history.

(56) References Cited

U.S. PATENT DOCUMENTS

2014/0029323 A1    1/2014    Makita et al.

FOREIGN PATENT DOCUMENTS

| JP | 06-261556 A | 9/1994 |
| JP | 07-7958 A | 1/1995 |

(Continued)

OTHER PUBLICATIONS

International Search Report (PCT/ISA/210) issued in PCT Application No. PCT/JP2014/056122 dated Jun. 3, 2014 with English translation (4 pages).

*Primary Examiner* — Jung Kim
(74) *Attorney, Agent, or Firm* — Crowell & Moring LLP (57) ABSTRACT

An imbalance of control signals between two power semiconductor elements is reduced. A first power semiconductor module and a second power semiconductor module are arranged in a predetermined direction along a surface of a control signal wiring circuit board, each of longitudinal directions of the first power semiconductor module and the second power semiconductor module along the surface of the control signal wiring circuit board is a predetermined direction, and, in a first control signal wiring, a distance between an external control signal terminal and a second control signal terminal is equal to a distance between the external control signal terminal and a first control signal terminal.

11 Claims, 8 Drawing Sheets

(51) Int. Cl.
*H02J 9/06* (2006.01)
*H02M 7/217* (2006.01)
*H02M 7/537* (2006.01)
*H02M 7/5387* (2007.01)

(52) U.S. Cl.
CPC ......... *H02M 7/2173* (2013.01); *H02M 7/537* (2013.01); *H02M 7/5387* (2013.01)

(56) References Cited

FOREIGN PATENT DOCUMENTS

| | | | | | |
|---|---|---|---|---|---|
| JP | 2012115093 | A | * | 6/2012 | ............ H01L 25/07 |
| JP | 2012115093 | A | | 6/2012 | |
| JP | 2013-5067 | A | | 1/2013 | |
| JP | 2014-27831 | A | | 2/2014 | |
| JP | 2014027831 | A | * | 2/2014 | .............. H02M 1/00 |

* cited by examiner

POWER CONVERSION UNIT, POWER CONVERTER, AND POWER CONVERSION METHOD

TECHNICAL FIELD

The present invention relates to a circuit for converting power.

BACKGROUND ART

In recent years, increase in a capacity of an inverter serving as a power converter has been demanded. In order to increase the capacity, it is necessary to connect IGBTs (Insulated Gate Bipolar Transistors) which are power semiconductor elements or freewheeling diodes in parallel.

However, in the case where power semiconductor modules including power semiconductor elements such as IGBTs or diodes are connected in parallel, it is problematic in that an imbalance of current flowing through the power semiconductor elements connected in parallel occurs due to an imbalance of parasitic resistance or parasitic inductance in power wirings of the power semiconductor elements. Output current tends to be concentrated on a power semiconductor element in which a parasitic resistance or a parasitic inductance of a power wiring is small, and therefore a life and reliability of the power semiconductor element may be reduced.

Regarding the above problem, for example, PTL 1 discloses a technique for achieving equal output current by having an equal impedance in power wirings connecting power semiconductor elements. PTL 2 discloses a structure for correcting a current imbalance and reducing a surge voltage by having equal current flowing through switching elements and minimizing a conductor connecting the switching elements.

CITATION LIST

Patent Literatures

PTL 1: JP-A-7-007958
PTL 2: JP-A-6-261556

SUMMARY OF INVENTION

Technical Problem

However, an imbalance of current occurs also due to an imbalance between control signal wirings of power semiconductor elements.

Solution to Problem

In order to solve the above problem, a power conversion unit which is an embodiment of the invention includes: a first power semiconductor module including a first circuit portion for converting power, a first power terminal for inputting/outputting power to/from the first circuit portion, and a first control signal terminal for inputting a control signal to the first circuit portion; a second power semiconductor module including a second circuit portion for converting power, a second power terminal for inputting/outputting power to/from the second circuit portion, and a second control signal terminal for inputting a control signal to the second circuit portion; a power wiring connecting the first power terminal and the second power terminal in parallel to an external power terminal for inputting/outputting power; and a control signal wiring circuit board including a first control signal wiring connecting the first control signal terminal and the second control signal terminal in parallel to an external control signal terminal for receiving a control signal from a control device. The first power semiconductor module and the second power semiconductor module are arranged in a predetermined direction along a surface of the control signal wiring circuit board, each of longitudinal directions of the first power semiconductor module and the second power semiconductor module in a surface direction of the control signal wiring circuit board is the predetermined direction, and, in the first control signal wiring, a distance between the external control signal terminal and the second control signal terminal is equal to a distance between the external control signal terminal and the first control signal terminal.

Advantageous Effects of Invention

According to an embodiment of the invention, it is possible to reduce an imbalance of control signals between two power semiconductor elements.

DESCRIPTION OF EMBODIMENTS

Examples of the invention will be described below with reference to drawings. Note that the same components in the drawings are denoted by the same reference signs and repeated description thereof is omitted.

Example 1

Figure 1:
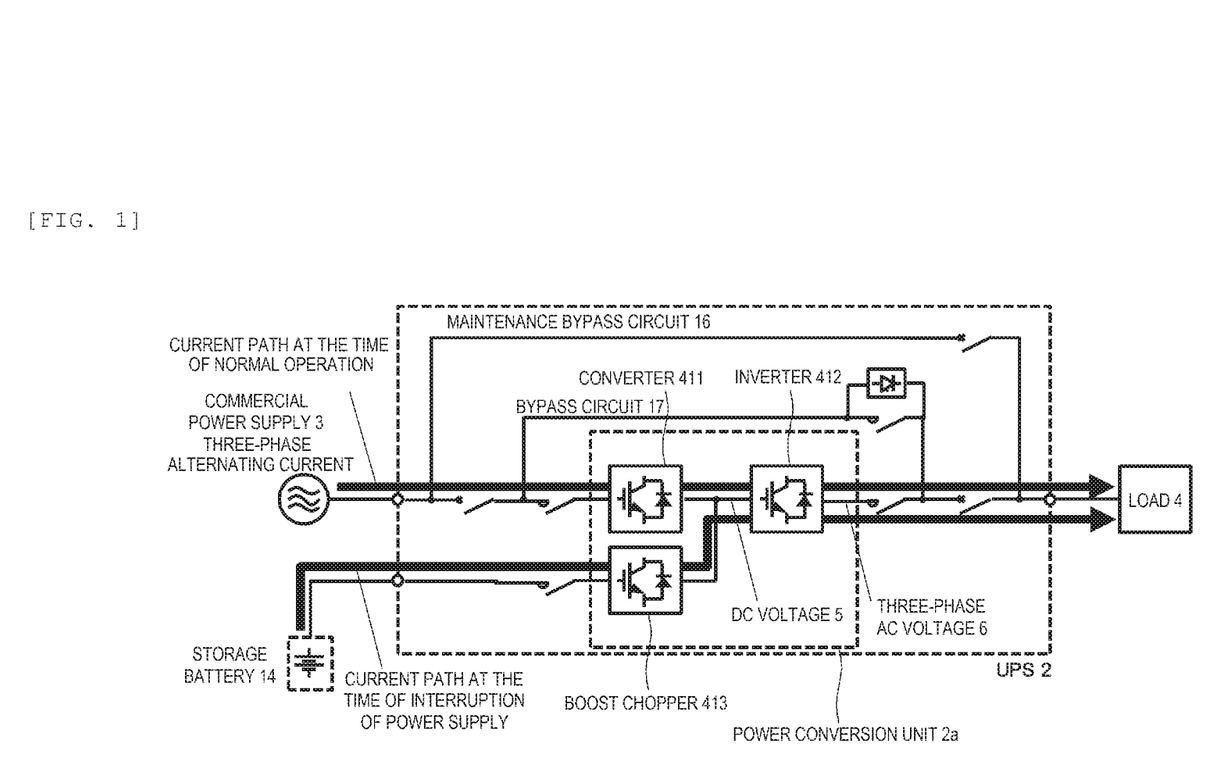
FIG. 1 is a circuit diagram of a UPS according to an example.

A UPS (Uninterruptible Power-supply System) will be described as an example.
FIG. 1 is a circuit diagram of a UPS according to an example.
This UPS 2 is an online type UPS that can uninterruptedly continue power supply at the time of interruption of power supply. Note that the invention is not limited to the online type UPS and may also be another type UPS such as an off line type UPS.

A commercial power supply 3 having a three-phase alternating current supplies power to a load 4 via an converter 411 and an inverter 412 at the time of normal operation. Herein, the converter 411 converts the commercial power supply 3 having a three-phase alternating current into a DC voltage 5 and supplies the DC voltage 5 to the inverter 412. The inverter 412 converts the DC voltage 5 into a three-phase AC power 6. With this, even in the case where a change in voltage such as instantaneous voltage drop occurs in the commercial power supply 3, power that is equal to that of a normal commercial power supply can be stably supplied to the load 4 by the converter 411 and the inverter 412 performing control.

Meanwhile, at the time of interruption of power supply, power is supplied to the load 4 from a storage battery 14 via the inverter 412 while the inverter 412 is on. With this, the UPS 2 can uninterruptedly supply power to the load 4. In this example, in order to reduce a volume of the UPS 2, a total voltage of the storage battery 14 is satisfactorily lower than a DC voltage applied to the inverter 412. Therefore, the UPS 2 in this example includes a boost chopper 413 for boosting a low DC voltage output by discharging electricity from the storage battery 14 to a desired DC voltage 5 and outputting the DC voltage 5 to the inverter 412. Note that, in the case where there is no limitation in the volume, the UPS 2 excluding the boost chopper 413 is also applicable to a UPS 2 including a high-voltage storage battery 14 that can supply a desired DC voltage.

In the following description, the converter 411, the inverter 412, and the boost chopper 413 will be referred to as a power converter 2a.

The UPS 2 may further include a cooling mechanism for performing air-cooling on the power converter 2a.

A bypass circuit 17 bypasses the power converter 2a in response to an instruction, thereby directly connecting the commercial power supply 3 and the load 4. A maintenance bypass circuit 16 bypasses the power converter 2a and the bypass circuit 17 in response to an instruction in order to maintain the power converter 2a and the bypass circuit 17, thereby directly connecting the commercial power supply 3 and the load 4.

A power conversion unit 300 constituting the power converter 2a will be described below.

The power converter 2a includes a plurality of power conversion units 300. The converter 411 is constituted by connecting three power conversion units 300 corresponding to three phases R, S, and T in parallel. The inverter 412 is constituted by connecting three power conversion units 300 corresponding to three phases U, V, and W in parallel. The boost chopper 413 is constituted by at least one power conversion unit 300.

Figure 2:
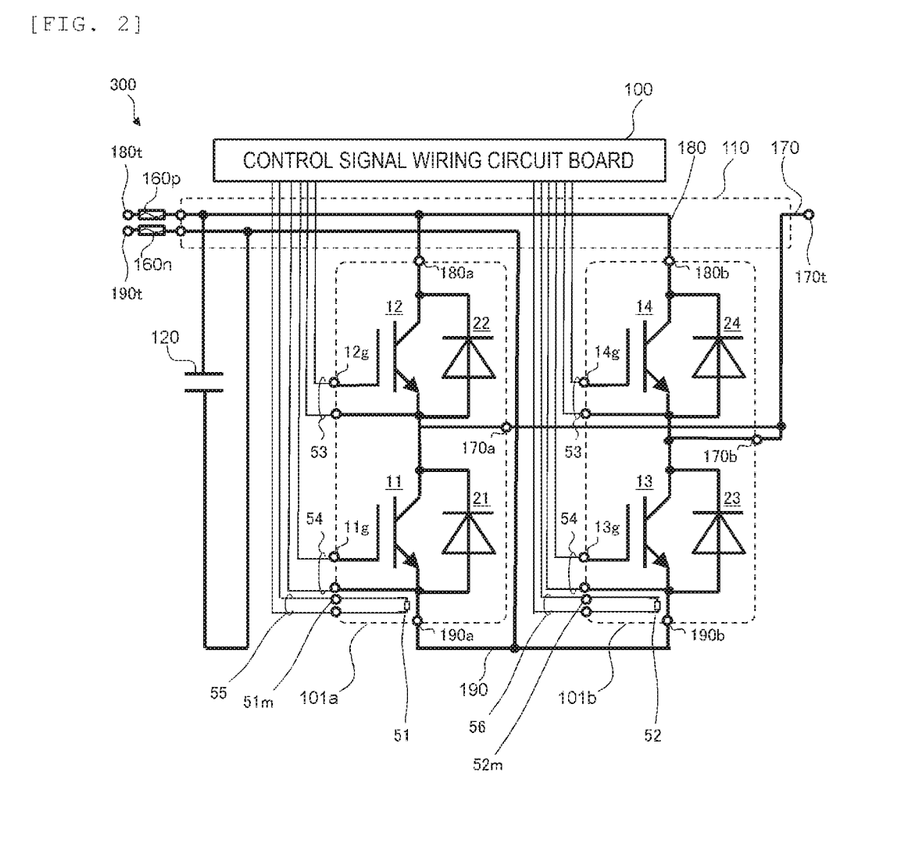
FIG. 2 is a circuit diagram of a power conversion unit 300.

FIG. 2 is a circuit diagram of the power conversion unit 300.

The power conversion unit 300 includes power semiconductor modules 101a and 101b, a smoothing capacitor 120, short-circuit protection elements (fuses) 160p and 160n, a control signal wiring circuit board 100, and a power wiring aggregate 110. The power wiring aggregate 110 is integration of an output wiring 170, a positive-electrode power wiring 180, and a negative-electrode power wiring 190. For example, the output wiring 170, the positive-electrode power wiring 180, and the negative-electrode power wiring 190 are formed as flat-plate like conductors, and the output wiring 170, the positive-electrode power wiring 180, and the negative-electrode power wiring 190 are insulated and laminated, and thus the power wiring aggregate 110 is formed as flat-plate like.

The power semiconductor module 101a includes a power semiconductor element 11, a freewheeling element 21 connected in parallel to the power semiconductor element 11, a power semiconductor element 12 connected in series to a positive-electrode side of the power semiconductor element 11, a freewheeling element 22 connected in parallel to the power semiconductor element 12, and a temperature detection element 51 for detecting a temperature in the power semiconductor module 101a. Similarly, the power semiconductor module 101b includes a power semiconductor element 13, a freewheeling element 23 connected in parallel to the power semiconductor element 13, a power semiconductor element 14 connected in series to a positive-electrode side of the power semiconductor element 13, a freewheeling element 24 connected in parallel to the power semiconductor element 14, and a temperature detection element 52 for detecting a temperature in the power semiconductor module 101b. In this example, the power semiconductor modules 101a and 101b have the same configuration. The power semiconductor elements 11, 12, 13, and 14 are, for example, switching elements such as IGBTs. The freewheeling elements 21, 22, 23, and 24 are, for example, diodes.

Positive-electrode power elements 180a and 180b of the power semiconductor modules 101a and 101b are positive electrodes of the power semiconductor elements 12 and 14, respectively. The positive-electrode power elements 180a and 180b are connected to one end of the positive-electrode side short-circuit protection element 160p via the positive-electrode power wiring 180, and the other end of the short-circuit protection element 160p serves as an external positive-electrode power terminal 180t. Negative-electrode power terminals 190a and 190b of the power semiconductor modules 101a and 101b are negative electrodes of the power semiconductor elements 11 and 13, respectively. The negative-electrode power terminals 190a and 190b are connected to the negative-electrode side short-circuit protection element 160n via the negative-electrode power wiring 190, and the other end of the short-circuit protection element 160n serves as an external negative-electrode power terminal 190t. With this, the power semiconductor modules 101a and 101b are connected to each other in parallel. The external positive-electrode power terminal 180t is connected to an external positive-electrode power terminal of another power conversion unit 300 via a unit connection portion. The external negative-electrode power terminal 190t is connected to an external negative-electrode power terminal of another power conversion unit 300 via the unit connection portion. The unit connection portion is, for example, a bus bar including a positive electrode conductor for connecting the external positive-electrode power terminals 180t of the plurality of power units 300 and a negative electrode conductor for connecting the external negative-electrode power terminals 190t of the plurality of power units 300. The output wiring 170 connects an output power terminal 170a between the power semiconductor elements 11 and 12 in the power semiconductor module 101a and an output power terminal 170b between the power semiconductor elements 13 and 14 in the power semiconductor module 101b to an external output terminal 170t. In the following description, the positive-electrode power terminal 180a, the negative-electrode power terminal 190a, and the output power terminal 170a of the power semiconductor module 101a, and the positive-electrode power terminal 180b, the negative-electrode power terminal 190b, and the output power terminal 170b of the power semiconductor module 101b will be referred to as power terminals in some cases.

The temperature detection element 51 is connected to a temperature detection terminal 51m, and the temperature detection terminal 51m is connected to the control signal wiring circuit board 100. The temperature detection element 52 is connected to a temperature detection terminal 52m, and the temperature detection terminal 52m is connected to the control signal wiring circuit board 100.

The smoothing capacitor 120 may be a plurality of capacitors connected in parallel to each other.

In the case where the power semiconductor modules 101a and 101b are connected in parallel, control signal terminals 11g, 12g, 13g, and 14g thereof also need to be connected in parallel. Control signal wirings of the power semiconductor module 101a and the power semiconductor module 101b are arranged on the control signal wiring circuit board 100. The control signal terminals 11g, 12g, 13g, and 14g are gate terminals of the power semiconductor elements 11, 12, 13, and 14, respectively.

Figure 3:
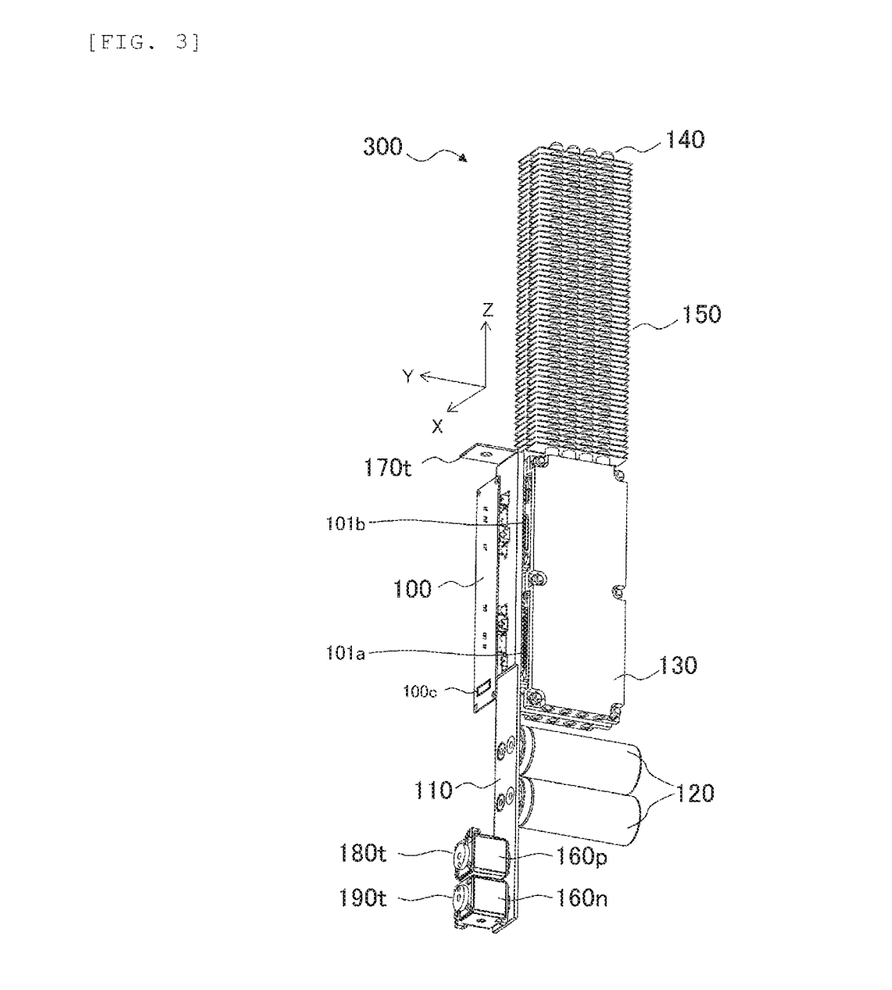
FIG. 3 is a perspective diagram of the power conversion unit 300.
Figure 4:
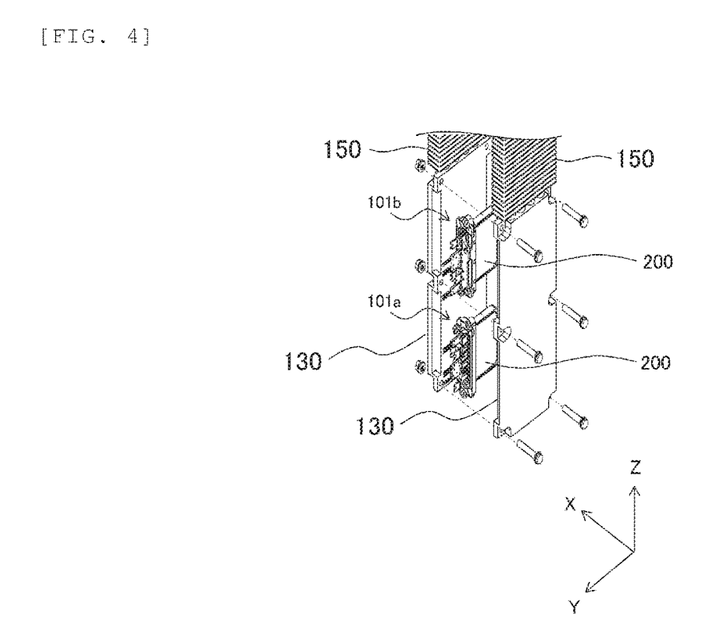
FIG. 4 is an exploded perspective diagram of and around power semiconductor modules 101a and 101b in the power conversion unit 300.

FIG. 3 is a perspective diagram of the power conversion unit 300, and FIG. 4 is an exploded perspective diagram of and around the power semiconductor modules 101a and 101b in the power conversion unit 300.

Herein, a short direction of the control signal wiring circuit board 100 that is a rectangular flat plate is defined as an X direction. A thickness direction of the control signal wiring circuit board 100, which is a direction of the control signal wiring circuit board 100 with respect to the power semiconductor modules 101a and 101b and a heat receiving portion 130, is defined as a Y direction. A longitudinal direction of the control signal wiring circuit board 100, which is a direction of a radiator fin 150 with respect to the power semiconductor modules 101a and 101b and the heat receiving portion 130, is defined as a Z direction. The power semiconductor modules 101a and 101b are arranged side by side in the Z direction.

Each of the power semiconductor modules 101a and 101b includes: a circuit portion having a flat-plate shape in parallel to a YZ plane and including a power semiconductor element and a freewheeling element; and a terminal portion protruded in the Y direction from the circuit portion and including a power terminal and a control signal terminal. Radiating surfaces 200 are provided on both surfaces of the circuit portion and are in contact with the heat receiving portions 130. The two heat receiving portions 130 face to each other in the X direction, and the heat receiving portions 130 are fixed with bolts while the circuit portion of each of the power semiconductor modules 101a and 101b is being inserted therebetween. A heat pipe 140 is protruded in the Z direction through the heat receiving portions 130 and a protruded portion thereof is connected to the radiator fin 150.

A power terminal of the terminal portion is connected to the power wiring aggregate 110. A control signal terminal of the terminal portion is connected to the control signal wiring circuit board 100 through an opening formed in the power wiring aggregate 110.

The power wiring aggregate 110 is further connected to the smoothing capacitor 120 and the short-circuit protection elements 160p and 160n for short-circuit protection. The smoothing capacitor 120 is connected between the positive-electrode power wiring 180 and the negative-electrode power wiring 190. The positive-electrode power wiring 180 and the negative-electrode power wiring 190 are connected to a power supply system via the short-circuit protection elements 160p and 160n, respectively. In the case where a short-circuit current flows due to, for example, breakage of an element included in the power conversion unit 300, the short-circuit protection elements 160p and 160n are disconnected due to the short-circuit current, and power supply of the power conversion unit 300 is cut off.

The control signal wiring circuit board 100 is connected to a control device such as a microprocessor via a control signal connector 100c, receives drive signals from the control device, and distributes the drive signals into the power semiconductor modules 101a and 101b with an equal impedance. The power semiconductor modules 101a and 101b perform switching in accordance with the drive signals and output current via the output wiring 170.

In this case, heat generated due to loss of the power semiconductor modules 101a and 101b is transmitted to the heat receiving portions 130 from the radiating surface 200 and is transmitted to the heat pipe 140 from the heat receiving portions 130. The heat pipe 140 can efficiently transmit heat between the heat receiving portions 130 and the radiator fin 150. The radiator fin 150 can suppress increase in temperature of the power semiconductor modules 101a and 101b by emitting heat toward coolant. For example, a fan serving as a cooling mechanism is provided in the Y direction of the radiator fin 150 and cools the radiator fin 150 by sending air in a −Y direction. Because the both surfaces of the circuit portion are inserted between the heat receiving portions 130, it is possible to improve cooling efficiency of the power semiconductor modules 101a and 101b.

In the case where the plurality of power conversion units 300 are connected in parallel, the external positive-electrode power terminals 180t of the plurality of power conversion units 300 are connected via the unit connection portion and the external negative-electrode power terminals 190t of the plurality of power conversion units 300 are connected via the unit connection portion. With this configuration, a manager of the power conversion units 300 can easily perform maintenance of the power conversion units 300 from the Y direction of the power conversion units 300.

Figure 5:
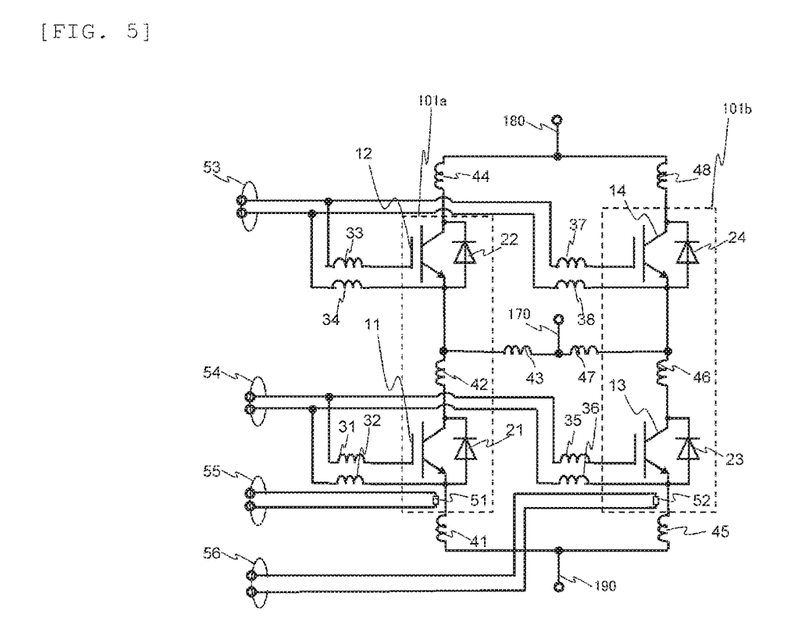
FIG. 5 is a circuit diagram of the power semiconductor modules 101a and 101b.

FIG. 5 is a circuit diagram of the power semiconductor modules 101a and 101b.

An internal parasitic element 42 exists in the power semiconductor module 101a. Similarly, an internal parasitic element 46 exists in the power semiconductor module 101b. Herein, the power semiconductor module 101a and the power semiconductor module 101b are generally prepared by the same production process, and therefore the internal parasitic element 42 of the power semiconductor module 101a and the internal parasitic element 46 of the power semiconductor module 101b are expected to have an equal parasitic impedance.

The high-side (positive-electrode side) control signal terminals 11g and 13g, which are gate terminals of the power semiconductor elements 11 and 13, are connected to a high-side signal wiring 53. The low-side (negative-electrode side) control signal terminals 12g and 14g, which are gate terminals of the power semiconductor elements 12 and 14, are connected to a low-side signal wiring 54. Further, the temperature detection element 51 included in the power semiconductor module 101a is connected to a temperature detection element signal wiring 55, and the temperature detection element 52 included in the power semiconductor module 101b is connected to a temperature detection element signal wiring 56.

Control signal wiring external parasitic elements 33 and 34 exist between the high-side control signal terminal of the power semiconductor module 101a and the high-side signal wiring 53, and control signal wiring external parasitic elements 37 and 38 exist between the high-side control signal terminal of the power semiconductor module 101*b* and the high-side signal wiring 53. Control signal wiring external parasitic elements 31 and 32 exist between the low-side control signal terminal of the power semiconductor module 101*a* and the low-side signal wiring 54, and control signal wiring external parasitic elements 35 and 36 exist between the low-side control signal terminal of the power semiconductor module 101*b* and the low-side signal wiring 54.

In the case where the power semiconductor module 101*a* and the power semiconductor module 101*b* are connected in parallel, an external parasitic element 44 exists between the power semiconductor module 101*a* and the positive-electrode power wiring 180, and an external parasitic element 48 exists between the power semiconductor module 101*b* and the positive-electrode power wiring 180. Further, an external parasitic element 43 exists between the power semiconductor module 101*a* and the output wiring 170, and an external parasitic element 47 exists between the power semiconductor module 101*b* and the output wiring 170. Furthermore, an external parasitic element 41 exists between the power semiconductor module 101*a* and the negative-electrode power wiring 190, and an external parasitic element 45 exists between the power semiconductor module 101*b* and the negative-electrode power wiring 190.

Figure 6:
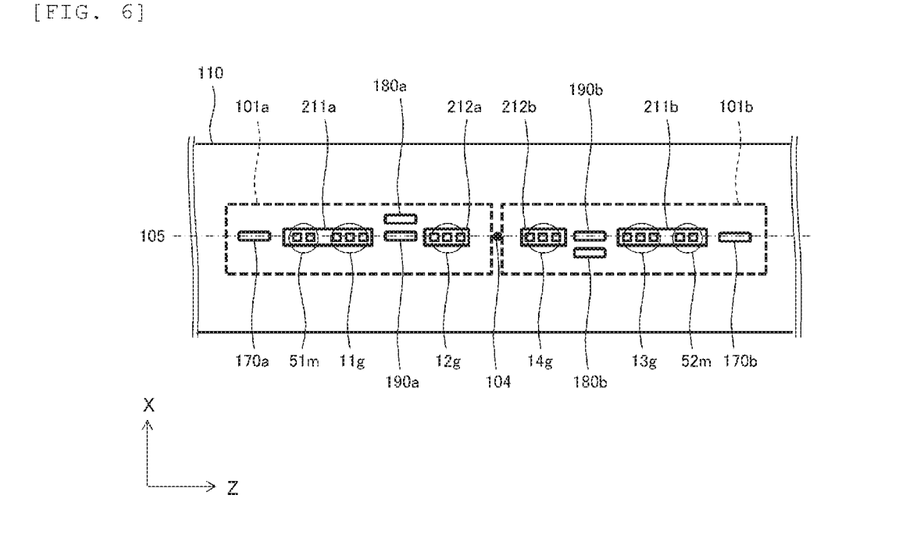
FIG. 6 is a plan view of a power wiring aggregate 110 seen in a Y direction.

FIG. 6 is a plan view of the power wiring aggregate 110 seen in the Y direction.

The power wiring aggregate 110 is arranged to be in the Y direction with respect to the power semiconductor module 101*a* and the power semiconductor module 101*b* and be vertical to a Y axis. The power semiconductor module 101*a* and the power semiconductor module 101*b* are arranged to have rotational symmetry with respect to a rotational axis 104 in parallel to the Y axis. That is, the output power terminal 170*a*, the positive-electrode power terminal 180*a*, the negative-electrode power terminal 190*a*, the control signal terminals 11*g* and 12*g*, and the temperature detection terminal 51*m* of the power semiconductor module 101*a* and the output power terminal 170*b*, the positive-electrode power terminal 180*a*, the negative-electrode power terminal 190*b*, the control signal terminals 13*g* and 14*g*, and the temperature detection terminal 52*m* of the power semiconductor module 101*b* are arranged to have rotational symmetry with respect to the rotational axis 104.

Among them, the output power terminal 170*a*, the positive-electrode power terminal 180*a*, the negative-electrode power terminal 190*a*, the output power terminal 170*b*, the positive-electrode power terminal 180*b*, and the negative-electrode power terminal 190*b* are connected to the power wiring aggregate 110. The power wiring aggregate 110 has openings 211*a*, 212*a*, 211*b*, and 212*b* arranged along a straight line 105 in parallel to a Z axis. The temperature detection terminal 51*m* and the control signal terminal 11*g* pass through the opening 211*a* and are protruded from the power wiring aggregate 110 in the Y direction. The control signal terminal 12*g* passes through the opening 212*a* and is protruded from the power wiring aggregate 110 in the Y direction. The control signal terminal 14*g* passes through the opening 212*b* and is protruded from the power wiring aggregate 110 in the Y direction. The control signal terminal 13*g* and the temperature detection terminal 52*m* pass through the opening 211*b* and are protruded from the power wiring aggregate 110 in the Y direction.

In the case where the power semiconductor module 101*a* and the power semiconductor module 101*b* are connected in parallel, an imbalance between the external parasitic elements occurs depending on arrangement of the power wirings. In view of this, the power terminals of the power semiconductor module 101*a* and the power semiconductor module 101*b* are arranged to have rotational symmetry with respect to the rotational axis 104 and are connected in parallel, and therefore the imbalance between the external parasitic elements is corrected and equalization of output current is achieved.

Figure 7:
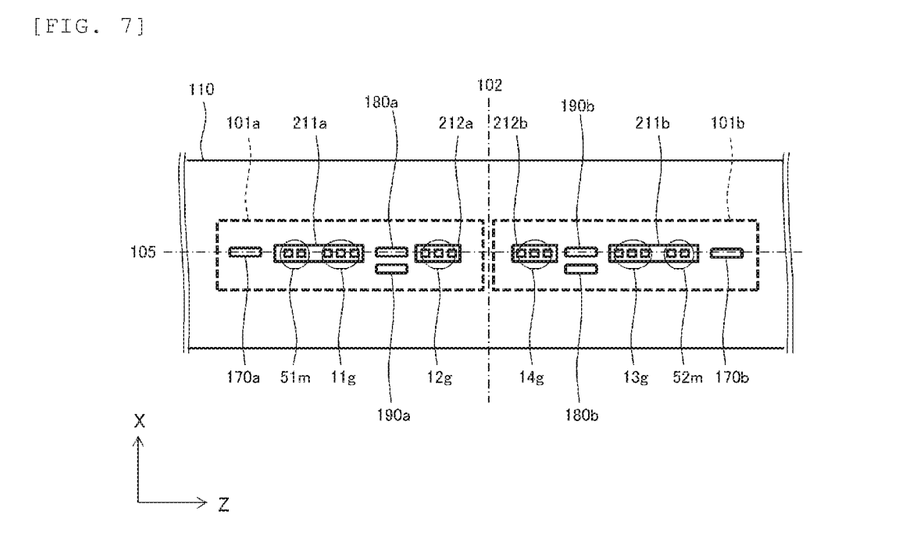
FIG. 7 is a plan view of a first modification example of the power wiring aggregate 110.

FIG. 7 is a plan view of a first modification example of the power wiring aggregate 110.

In this first modification example, the power terminals of the power semiconductor module 101*a* and the power semiconductor module 101*b* are arranged to have mirror symmetry with respect to a mirror plane 102 positioned between the power semiconductor modules 101*a* and 101*b* and are connected in parallel, and therefore an imbalance between the external parasitic elements is corrected and equalization of output current is achieved.

Figure 8:
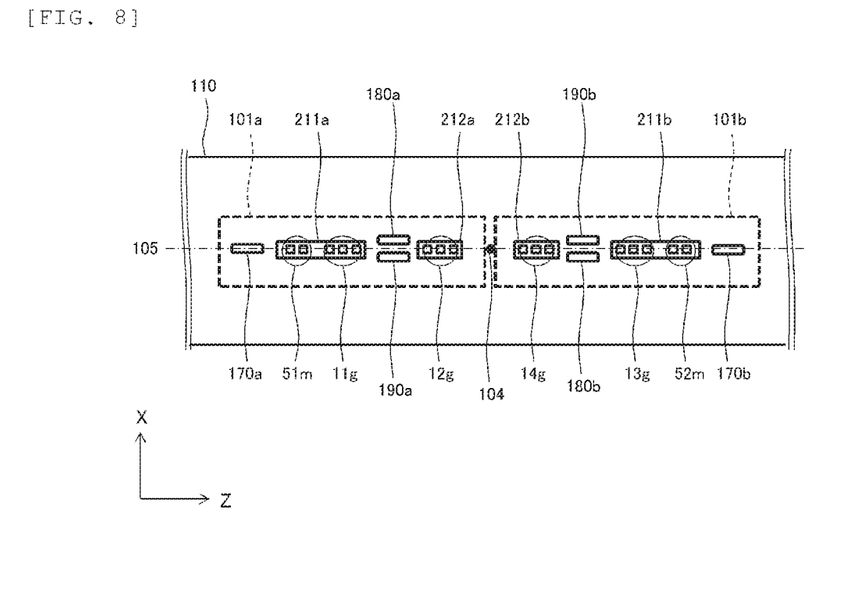
FIG. 8 is a plan view of a second modification example of the power wiring aggregate 110.

FIG. 8 is a plan view of a second modification example of the power wiring aggregate 110.

In this second modification example, the power terminals of the power semiconductor module 101*a* and the power semiconductor module 101*b* are arranged to have rotational symmetry with respect to the rotational axis 104 and are connected in parallel, and therefore an imbalance between the external parasitic elements is corrected and equalization of output current is achieved. Further, the power terminals of the power semiconductor module 101*a* and the power semiconductor module 101*b* are arranged to mirror symmetry with respect to the straight line 105.

Note that, in the power conversion unit 300 in the example or the power conversion unit 300 in the second modification example, the power semiconductor module 101*a* and the power semiconductor module 101*b* may be formed to have a mirror symmetry with respect to the mirror plane 102 by switching the positive-electrode power wiring 180 and the negative-electrode power wiring 190 of one power semiconductor module of the power semiconductor module 101*a* and the power semiconductor module 101*b*.

Figure 9:
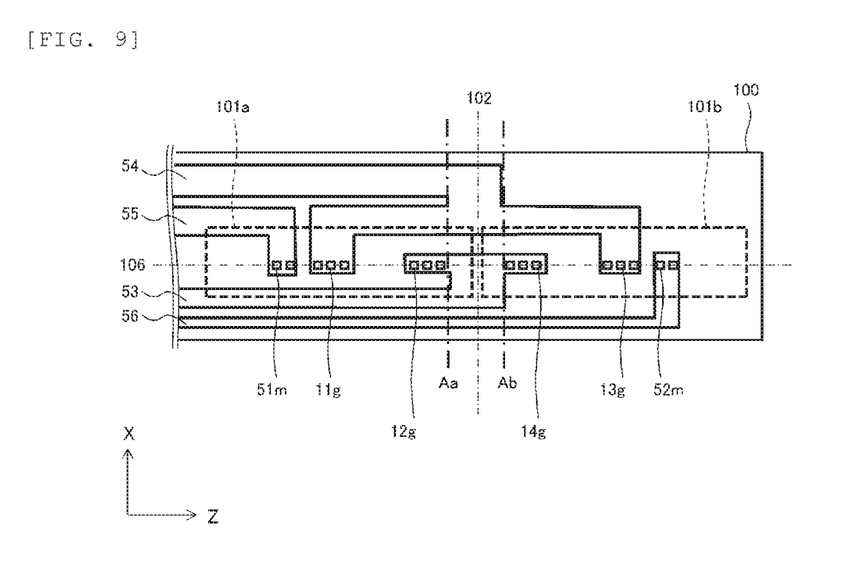
FIG. 9 is a plan view of a control signal wiring circuit board 100 seen in a Y direction.

FIG. 9 is a plan view of the control signal wiring circuit board 100 seen in the Y direction.

The control signal wiring circuit board 100 is arranged to be in the Y direction with respect to the power wiring aggregate 110 and be vertical to the Y axis. The control signal wiring circuit board 100 is a multilayer circuit board. In a control signal wiring layer that is a layer illustrated in FIG. 9, the high-side signal wiring 53, the low-side signal wiring 54, and the temperature detection element signal wirings 55 and 56 are arranged. In other layers, a power supply wiring or wirings of other components are arranged.

In the control signal wiring layer, the temperature detection terminal 51*m*, the control signal terminal 11*g*, the control signal terminal 12*g*, the control signal terminal 14*g*, the control signal terminal 13*g*, and the temperature detection terminal 52*m* are connected in this order along a straight line 106 in parallel to the Z axis. Further, the temperature detection terminal 51*m*, the low-side control signal terminal 11*g*, and the high-side control signal terminal 12*g* and the temperature detection terminal 52*m*, the low-side control signal terminal 13*g*, and the high-side control signal terminal 14*g* are arranged to have mirror symmetry with respect to the mirror plane 102 positioned between the power semiconductor modules 101*a* and 101*b*.

In the control signal wiring layer, an area between the control signal terminals 12*g* and 14*g*, the area being between straight lines Aa and Ab that are straight lines in parallel to the X axis and are positioned at a certain distance from the mirror plane 102, is defined as a central area. In the control signal wiring circuit board 100, a control signal wiring from the control device is branched into two control signal wirings in the central area, and the control signal wirings between the central area and the terminals of the power semiconductor modules 101a and 101b have a shape of mirror symmetry with respect to the mirror plane 102. That is, the high-side signal wiring 53 and the low-side signal wiring 54 have respective branch points in the central area. With this, distances of the signal wirings between the central area and the two control signal terminals of the power semiconductor modules 101a and 101b are equal. That is, in the high-side signal wiring 53 and the low-side signal wiring 54, distances of the signal wirings between the control device and the two control signal terminals are equal.

In the case where the power semiconductor modules 101a and 101b are connected in parallel and an imbalance of impedance between the control signal wiring external parasitic elements occurs, an imbalance of output current may occur, as in the case of the power wirings. According to the control signal wiring circuit board 100 in this example, it is possible to equalize impedances of the control signal wiring external parasitic elements of the power semiconductor modules 101a and 101b existing in the high-side signal wiring 53 and the low-side signal wiring 54.

The temperature detection element signal wirings 55 and 56 are independent signal wirings, respectively, and therefore do not need branch points.

The high-side control signal wiring 53, the low-side signal wiring 54, and the temperature detection element signal wirings 55 and 56 are not overlapped on one another in the thickness direction of the control signal wiring circuit board 100. Further, the high-side control signal wiring 53, the low-side signal wiring 54, and the temperature detection element signal wirings 55 and 56 do not have an area where the above wirings and wirings in other layers are not overlapped on one another. As an effect of this, it is possible to suppress mismatching of impedance caused by connection between layers of the control signal wirings. As a result, it is possible to equalize control signals and correct an imbalance of output current.

According to this example, it is possible to equalize output current of the power semiconductor elements connected in parallel by equalizing impedances of power wirings of the power semiconductor elements connected in parallel and the control signal wirings.

Example 2

Figure 10:
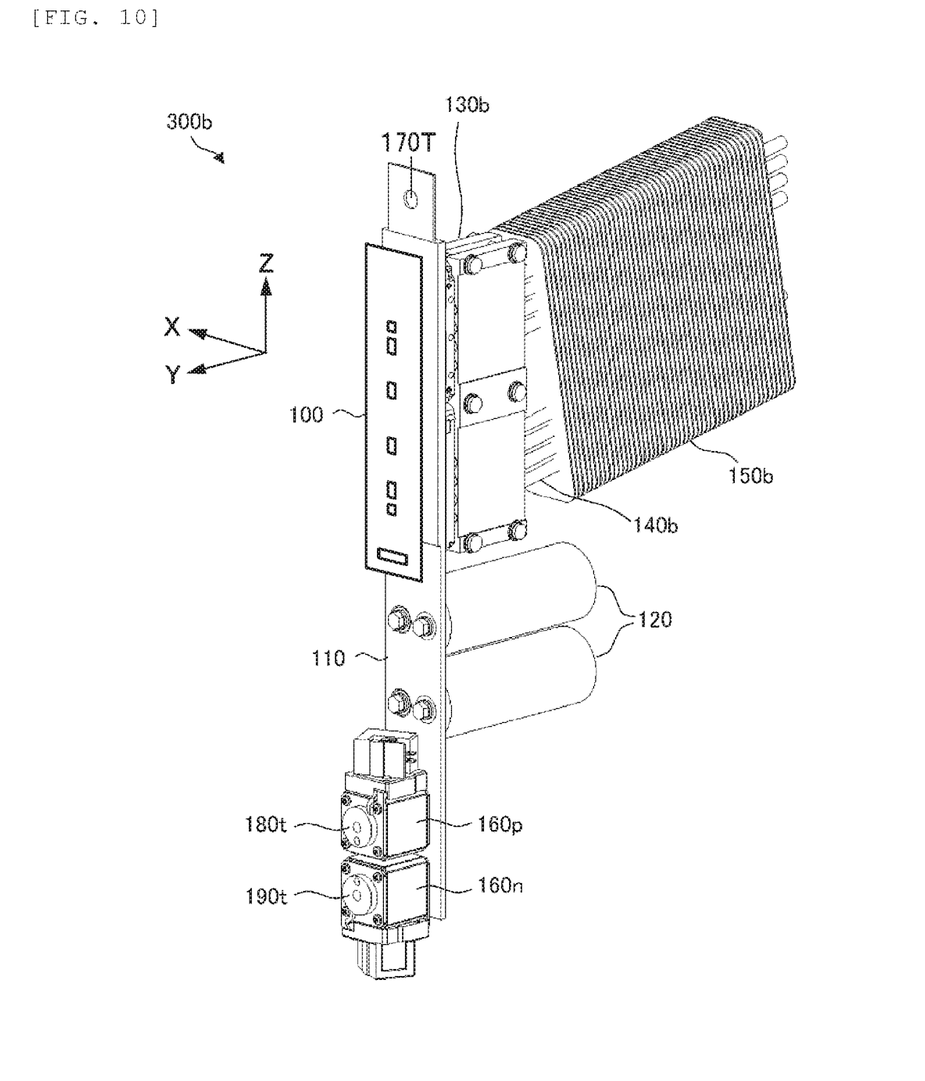
FIG. 10 is a perspective diagram of a power conversion unit 300b in Example 2.

FIG. 10 is a perspective diagram of a power conversion unit 300b in Example 2.

As compared with Example 1, the power conversion unit 300b in this example includes a heat receiving portion 130b instead of the heat receiving portion 130, includes a heat pipe 140b instead of the heat pipe 140, and includes a radiator fin 150b instead of the radiator fin 150. The heat pipe 140b passes through the heat receiving portion 130b and is protruded from the heat receiving portion 130b in a direction between a −Y direction and a Z direction. The radiator fin 150b is connected to a portion of the heat pipe 140b, the portion being protruded from the heat receiving portion 130b. In this example, for example, a fan is provided in the −Z direction of the radiator fin 150b and cools the radiator fin 150b by sending air in the Z direction.

Figure 11:
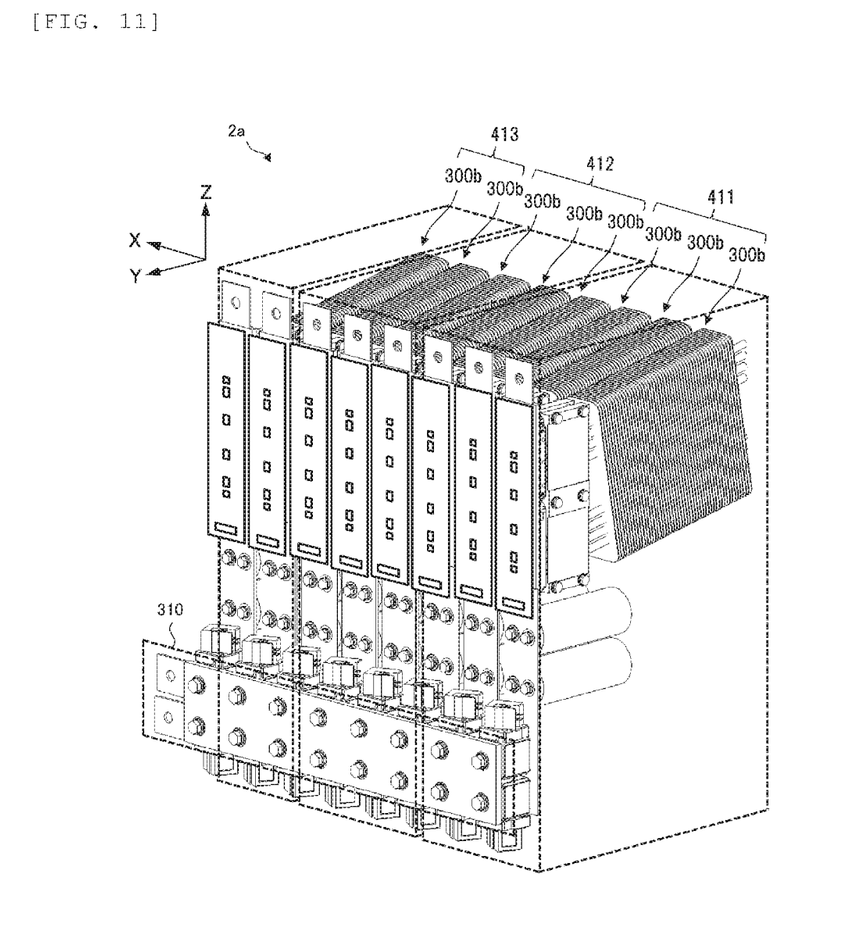
FIG. 11 is a perspective diagram of a power conversion part 2a in Example 2.

FIG. 11 is a perspective diagram of a power conversion part 2a in Example 2.

The power conversion part 2a in this example includes a plurality of power conversion units 300b. The plurality of power conversion units 300b are connected in parallel by a unit connection portion 310. The unit connection portion 310 includes a positive electrode conductor for connecting external positive-electrode power terminals 180t of the plurality of power conversion units and a negative electrode conductor for connecting external negative-electrode power terminals 190t of the plurality of power conversion units. Three power conversion units 300b of the plurality of power conversion units 300b constitute the converter 411, and other three power conversion units 300b thereof constitute the inverter 412, and other two power conversion units 300b thereof constitute the boost chopper 413.

Output wirings 170t of the three power conversion units 300b serving as the converter 411 correspond to three phases R, S, and T. Output wirings 170t of the three power conversion units 300b serving as the inverter 412 correspond to three phases U, V, and W. Each power conversion unit 300b is controlled by inputting a control signal from a control device to a control signal wiring circuit board 100 of the power conversion unit 300b. With this control method, the plurality of power conversion unit devices 300b can function as the converter 411, the inverter 412, and the boost chopper 413. Further, with this configuration, a manager of a UPS 2 can easily perform maintenance of the power conversion part 2a from a Y direction of the power conversion part 2a.

It is possible to achieve the power conversion part 2a by connecting the plurality of power conversion units 300 in Example 1 in parallel in the same way as the power conversion units 300b in Example 2.

As described above, the power conversion units 300 and 300b are applicable to a power converter including the converter 411, the inverter 412, the boost chopper 413, and the like and are applicable to a UPS, a PCS (Power Conditioning System), and the like including the power converter. The power conversion units 300 and 300b are also applicable to a power converter for driving a motor of an industrial machine.

Terms will be described. A power conversion unit corresponds to, for example, the power conversion units 300 and 300b. A power converter corresponds to, for example, the converter 411, the inverter 412, the boost chopper 413, and the UPS 2. A power wiring corresponds to, for example, the power wiring aggregate 110. A control signal wiring circuit board corresponds to, for example, the control signal wiring circuit board 100. A first circuit portion corresponds to, for example, the power semiconductor elements 11 and 12, the freewheeling elements 21 and 22, and the radiating surface 200. A first power terminal corresponds to, for example, the positive-electrode power terminal 180a, the negative-electrode power terminal 190a, and the output power terminal 170a. A first control signal terminal corresponds to, for example, the control signal terminal 11g. A second circuit portion corresponds to, for example, the power semiconductor elements 13 and 14, the freewheeling elements 23 and 24, and the radiating surface 200. A second power terminal corresponds to, for example, the positive-electrode power terminal 180b, the negative-electrode power terminal 190b, and the output power terminal 170b. An external power terminal corresponds to, for example, the external positive-electrode power terminal 180t and the external negative-electrode power terminal 190t. A second control signal terminal corresponds to, for example, the control signal terminal 13g. A first control signal wiring corresponds to, for example, the low-side control signal wiring 55. A first branch point corresponds to, for example, a portion of the low-side control signal wiring 55 in the central area. A third control signal terminal corresponds to, for example, the control signal terminal 12g. A fourth control signal terminal corresponds to, for example, the control signal terminal 14g. A second control signal wiring corresponds to, for example, the high-side control signal wiring 54. A second branch point corresponds to, for example, a portion of the high-side control signal wiring 54 in the central area. A heat receiving portion corresponds to, for example, the heat receiving portions 130 and 130b. A virtual plane corresponds to, for example, the mirror plane 102. A virtual straight line in a predetermined direction corresponds to, for example, the straight line 106. A capacitor corresponds to, for example, the smoothing capacitor 120. A short-circuit protection element corresponds to, for example, the short-circuit protection elements 160p and 160n. A unit connection portion corresponds to, for example, the unit connection portion 310. A virtual straight line vertical to the control signal wiring circuit board corresponds to, for example, the rotational axis 104.

The invention is not limited to the above examples and can be changed in other various forms within the scope of the invention.

REFERENCE SIGNS LIST

2: UPS
2a: power conversion part
11, 12, 13, 14: power semiconductor element
21, 22, 23, 24: freewheeling element
51, 52: temperature detection element
53: high-side signal wiring
54: low-side signal wiring
55, 56: temperature detection element signal wiring
100: control signal wiring circuit board
101a, 101b: power semiconductor module
110: power wiring aggregate
120: smoothing capacitor
130, 130b: heat receiving portion
140, 140b: heat pipe
150, 150b: radiator fin
160p, 160n: short-circuit protection element
170: output wiring
180: positive-electrode power wiring
190: negative-electrode power wiring
300, 300b: power conversion unit
310: unit connection portion
411: converter
412: inverter
413: boost chopper

The invention claimed is:
1. A power conversion unit, comprising:
a control signal wiring circuit board;
a first module in which terminals are arranged in order of a first terminal, a second terminal, and a third terminal in a longitudinal direction of the first module;
a second module in which terminals are arranged in order of a fourth terminal, a fifth terminal, and a sixth terminal in a longitudinal direction of the second module;
a first wiring connected to the first terminal, the fourth terminal, and the control signal wiring circuit board;
a second wiring connected to the second terminal, the fifth terminal, and the control signal wiring circuit board;
a third wiring connected to the third terminal and the control signal wiring circuit board; and
a fourth wiring connected to the sixth terminal and the control signal wiring circuit board, wherein
the first wiring, the second wiring, the third wiring, and the fourth wiring are insulated from one another, and
the first module and the second module are arranged on the control signal wiring circuit board, such that the first terminal and the fourth terminal face each other.

2. The power conversion unit according to claim 1, wherein
the first wiring comprises:
a first main line connecting from the control signal wiring circuit board to a first branch point;
a first branch line connecting from the first branch point to the first terminal; and
a fourth branch line connecting from the first branch point to the fourth terminal, wherein
the first and fourth branch lines have an identical length.

3. The power conversion unit according to claim 1, wherein
the second wiring comprises:
a second main line connecting from the control signal wiring circuit board to a second branch point;
a second branch line connecting from the second branch point to the second terminal; and
a fifth branch line connecting from the second branch point to the fifth terminal, wherein
the second and fifth branch lines have an identical length.

4. The power conversion unit according to claim 1, further comprising
a heat receiving portion into which a first circuit portion in the first module and a second circuit portion in the second module are inserted in a direction that is in parallel to a surface of the control signal wiring circuit board and is vertical to a predetermined direction in which direction the first and second modules are arranged, the heat receiving portion being for receiving heat from the first circuit portion and the second circuit portion.

5. The power conversion unit according to claim 1, wherein
the first wiring is a low-side control signal wiring, and
the second wiring is a high-side control signal wiring.

6. The power conversion unit according to claim 1, wherein
the first terminal, the second terminal, the third terminal, the fourth terminal, the fifth terminal and the sixth terminal are arranged on a virtual straight line.

7. The power conversion unit according to claim 1, wherein
the first wiring, the second wiring, the third wiring and the fourth wiring do not overlap one another in a thickness direction of the control signal wiring circuit board.

8. The power conversion unit according to claim 1, wherein
an external power terminal of the power conversion unit is connected to an external power terminal of another power conversion unit via a unit connection portion.

9. The power conversion unit according to claim 1, wherein
in power wiring, a distance between an external power terminal and the second terminal is equal to a distance between the external power terminal and the first terminal.

10. The power conversion unit according to claim 1, further comprising:
a capacitor connected in parallel to a first circuit portion in the first module and a second circuit portion in the second module via power wiring; and short-circuit protection elements connected in series to the first circuit portion and the second circuit portion via the power wiring.

11. The power conversion unit according to claim 1, wherein
the first module and the second module have an identical configuration and are arranged to have rotational symmetry with respect to a virtual straight line vertical to the control signal wiring circuit board.

* * * * *